(12) United States Patent
Harris

(10) Patent No.: US 9,594,345 B2
(45) Date of Patent: Mar. 14, 2017

(54) HYBRID REFLECTION HOLOGRAM

(71) Applicant: Ken R. Harris, Albuquerque, NM (US)

(72) Inventor: Ken R. Harris, Albuquerque, NM (US)

(73) Assignee: DiARTs AG S.A., Pregassona (CH)

(*) Notice: Subject to any disclaimer, the term of this patent is extended or adjusted under 35 U.S.C. 154(b) by 0 days.

(21) Appl. No.: 13/938,074

(22) Filed: Jul. 9, 2013

(65) Prior Publication Data

US 2013/0301092 A1      Nov. 14, 2013

Related U.S. Application Data

(60) Continuation of application No. 13/284,766, filed on Oct. 28, 2011, now Pat. No. 8,482,830, which is a
(Continued)

(51) Int. Cl.
*G03H 1/24*    (2006.01)
*G03H 1/02*    (2006.01)
(Continued)

(52) U.S. Cl.
CPC .......... *G03H 1/0248* (2013.01); *G03H 1/202* (2013.01); *G03H 1/0011* (2013.01);
(Continued)

(58) Field of Classification Search
None
See application file for complete search history.

(56) References Cited

U.S. PATENT DOCUMENTS

| 4,209,250 A | 6/1980 | James et al. |
| 4,888,260 A | 12/1989 | Cowan |

(Continued)

FOREIGN PATENT DOCUMENTS

| EP | 0303355 | 2/1989 |
| EP | 0305334 | 3/1989 |

(Continued)

OTHER PUBLICATIONS

Venus, George B. et al., "High-brightness narrow-line laser diode source with volume Bragg-grating feedback", Proc. of the SPIE, Bellingham, WA., Jan. 25, 2005, 166-176.
(Continued)

*Primary Examiner* — Derek S Chapel
(74) *Attorney, Agent, or Firm* — Philip D. Askenazy; Justin R. Muehlmeyer; Peacock Myers, P.C.

(57) ABSTRACT

Hybrid white-light viewable holograms and methods for making them. The holograms are hybrid reflection holograms made using the diffractive structures or gratings of a holographic object such as a transmission hologram or holographic optical element (HOE). The wavefronts of the diffractive structures are converted into a reflection hologram by scanning them with a coherent light source having a profiled narrow beam. The hybrid reflection hologram can exhibit display parameters including the multiple colors, solidity, and color stability of white light reflection holograms, the diffractive color shifting of a white light transmission hologram, three dimensional imaging and a wide variety of dynamic changes. Different areas or images with each of these effects can be combined in a single hologram. These hybrid reflection holograms are ideal for security and forgery prevention applications.

20 Claims, 4 Drawing Sheets

Related U.S. Application Data division of application No. 11/688,174, filed on Mar. 19, 2007, now abandoned, which is a continuation-in-part of application No. 11/459,821, filed on Jul. 25, 2006, now Pat. No. 7,616,363.

(60) Provisional application No. 60/783,502, filed on Mar. 17, 2006, provisional application No. 60/702,785, filed on Jul. 26, 2005.

(51) Int. Cl.
*G03H 1/20* (2006.01)
*G03H 1/00* (2006.01)
*G03H 1/04* (2006.01)
*G03H 1/22* (2006.01)

(52) U.S. Cl.
CPC ......... *G03H 1/0236* (2013.01); *G03H 1/0406* (2013.01); *G03H 1/0408* (2013.01); *G03H 1/0465* (2013.01); *G03H 1/24* (2013.01); *G03H 2001/0417* (2013.01); *G03H 2001/205* (2013.01); *G03H 2001/207* (2013.01); *G03H 2001/2231* (2013.01); *G03H 2210/46* (2013.01); *G03H 2210/54* (2013.01); *G03H 2210/562* (2013.01); *G03H 2222/36* (2013.01); *G03H 2227/04* (2013.01); *G03H 2240/52* (2013.01)

(56) References Cited

U.S. PATENT DOCUMENTS

| | | | |
|---|---|---|---|
| 4,915,464 A | | 4/1990 | Hopwood |
| 4,995,685 A | | 2/1991 | Armstrong et al. |
| 5,145,756 A | | 9/1992 | Windeln et al. |
| 5,182,180 A | * | 1/1993 | Gambogi et al. ............ 430/1 |
| 5,262,879 A | | 11/1993 | Davis |
| 5,537,232 A | * | 7/1996 | Biles ......................... 359/15 |
| 5,640,257 A | | 6/1997 | Clube |
| 5,687,012 A | * | 11/1997 | Kang et al. .................. 359/2 |
| 5,757,521 A | | 5/1998 | Walters et al. |
| 5,822,089 A | | 10/1998 | Phillips et al. |
| 5,822,092 A | | 10/1998 | Davis |
| 5,843,598 A | * | 12/1998 | Ueda et al. .................. 430/2 |
| 6,017,657 A | | 1/2000 | Mentz et al. |
| 6,486,982 B1 | | 11/2002 | Davis |
| 6,730,442 B1 | | 5/2004 | Sutherland et al. |
| 6,750,996 B2 | | 6/2004 | Jagt et al. |
| 6,849,149 B2 | * | 2/2005 | Otaki et al. ................ 156/277 |
| 6,876,473 B2 | * | 4/2005 | Drinkwater .................. 359/2 |
| 8,187,771 B2 | | 5/2012 | Staub et al. |
| 8,507,154 B2 | | 8/2013 | Hansen et al. |
| 2002/0018430 A1 | * | 2/2002 | Heckenkamp et al. . 369/109.01 |
| 2002/0044312 A1 | * | 4/2002 | Klug et al. .................. 359/9 |
| 2002/0109872 A1 | | 8/2002 | Hart |
| 2002/0126333 A1 | | 9/2002 | Hosono et al. |
| 2003/0185136 A1 | | 10/2003 | Kaiho et al. |
| 2004/0105963 A1 | * | 6/2004 | Bonkowski et al. ...... 428/195.1 |
| 2004/0146751 A1 | | 7/2004 | Cueli |
| 2005/0122549 A1 | | 6/2005 | Goulanian et al. |
| 2005/0224203 A1 | * | 10/2005 | Boehm et al. ............... 162/140 |
| 2006/0262367 A1 | * | 11/2006 | Hattori et al. .............. 359/15 |
| 2007/0216975 A1 | * | 9/2007 | Holmes ....................... 359/2 |

FOREIGN PATENT DOCUMENTS

| | | |
|---|---|---|
| EP | 0602829 | 6/1994 |
| EP | 0701183 A2 | 3/1996 |
| EP | 1199602 | 4/2002 |
| EP | 1 217 469 A2 | 6/2002 |
| EP | 1217469 A2 | 6/2002 |
| EP | 1278107 | 1/2003 |
| EP | 1 564 605 A2 | 8/2008 |
| EP | 1511636 B1 | 9/2008 |
| EP | 1511656 B1 | 11/2009 |
| GB | 2 254 166 A | 9/1992 |

OTHER PUBLICATIONS

Bjelkhagen, "New optical security device based on one-hundred-year-old photographic technique", Opt. Eng., 1999, 55-61.

* cited by examiner

HYBRID REFLECTION HOLOGRAM

CROSS-REFERENCE TO RELATED APPLICATIONS

This application is a continuation application of U.S. patent application Ser. No. 13/284,766, entitled "Hybrid Reflection Hologram", filed on Oct. 28, 2011 and issuing on Jul. 9, 2013 as U.S. Pat. No. 8,482,830, which application is a divisional application of U.S. patent application Ser. No. 11/688,174, entitled "Hybrid Reflection Hologram", filed on Mar. 19, 2007, which application claims the benefit of the filing of U.S. Provisional Patent Application Ser. No. 60/783,502, entitled "Method and Apparatus for Mass Production of Volume Holograms from Plane Holograms", filed on Mar. 17, 2006, and which application is also a continuation-in-part application of U.S. patent application Ser. No. 11/459,821, entitled "Method and Apparatus for Mass Production of Holograms", filed on Jul. 25, 2006, and issued as U.S. Pat. No. 7,616,363 on Nov. 10, 2009, which application claims the benefit of the filing of U.S. Provisional Patent Application Ser. No. 60/702,785, entitled "Method and Apparatus for Mass Production of Reflection Holograms and Volume Holographic Optical Elements", filed on Jul. 26, 2005. The specifications and claims of these patent applications are incorporated herein by reference.

BACKGROUND OF THE INVENTION

Field of the Invention (Technical Field)

The present invention is a method and apparatus for making a reflection hologram (or volume hologram) that is made using a transmission hologram (or plane hologram) as the object. This invention obtains the benefits of the transmission hologram's diffraction spectral color playback and color separation of a white light or other multi-wavelength source by directly converting the transmission hologram to a reflection hologram for security and forgery prevention. The present invention preferably utilizes a single color laser, or optionally a tunable laser or other coherence light source, to record the hologram by scanning the plane hologram with a profiled narrow beam. The resulting hybrid reflection hologram, when illuminated by white light, can replay in a single color or in the multiplicity of colors of the original transmission hologram while adding the unique optical characteristics of the reflection hologram.

Background Art

Note that the following discussion refers to a number of publications and references. Discussion of such publications herein is given for more complete background of the scientific principles and is not to be construed as an admission that such publications are prior art for patentability determination purposes.

Differentiation of Transmission and Reflection Holograms

When constructing a hologram, as the angle difference between the object beam (or the wavefronts bouncing off the object) and the reference beam changes, so does the spacing of the patterns in the emulsion. As long as the angle difference remains less than about 90 degrees the hologram is typically called a transmission hologram, where "plane" typically means that the holographic information is primarily contained in the two-dimensional plane of the emulsion. Although the emulsion does have a thickness, typically around seven microns, the spacing between fringes is large enough, when the angle is less than about 90 degrees, so that the depth of the emulsion isn't being utilized in the recording of the hologram. At about 90 degrees, which is really a convenient but arbitrary point, the angle is great enough, and fringe spacing has become small enough, so that the recording process is taking place throughout the volume of the thickness of the emulsion, thus producing a reflection hologram. Thus the same emulsion can be used to make both transmission and reflection holograms depending on the angle difference between the reference and object beams. (However, some emulsions or other photosensitive materials are better for either transmission holograms or reflection holograms.) Thus, as the incidence angle of the reference beam is rotated, either a transmission or reflection hologram is constructed, as shown in FIG. 1.

A very important point for differentiation occurs as the reference beam swings around its arc of possible positions. In a plane (transmission) hologram the reference beam is hitting the film from the same side as the object beam. In a volume (reflection) hologram the reference beam hits the film from the side opposite to the modulated object beam. When a difference of 180 degrees is reached, an in-line, volume reflection hologram is constructed.

A transmission type hologram means that the reference beam must be transmitted through the hologram, in order to decode the interference patterns and render the reconstructed image. The light which is used for playback of a transmission hologram must be coherent or semi-coherent or the image will not be sharp. If a non-coherent source is used, such as the light from a common, unfiltered slide projector, then the hologram will diffract all the different wavelengths. The interference pattern or grating etched in the emulsion is not particular as to which wavelengths it bends or focuses; therefore, the result is an unclear overlapping spectrum of colors which somewhat resemble the object. A hologram will playback just as well with laser light of a different color or wavelength than the light with which it was made. However, the object will appear to be of a different size and/or distance from the plate. For example, a hologram of an object made with red light will playback that object smaller or seemingly further away if a blue colored laser is used to view it. This is because the grating will bend the blue or shorter light less severely than the red with which it was made and with which it is intended to be decoded.

Unlike a transmission hologram, also called a thin, transmission, laser-illuminated, or phase hologram, which requires a coherent or highly filtered playback source, a reflection hologram, also called a volume or thick hologram, can be viewed very satisfactorily in white light or light which contains many different wavelengths. For best results, the light preferably should be from a point source and have limited divergence, such as light from a slide projector light or penlight, or the sun on a clear day. Any ambient light may alternatively be used, but this will typically produce lesser quality of the playback image. This ability to use white light occurs because, in a way, a reflection hologram acts as its own filter. In a reflection hologram the fringes are packed so closely together that they constitute layers throughout the thickness of the emulsion. The spacing between fringes remains constant. If the distance between fringes is two microns, for example, then the distance between the remaining layers of fringes will also be two microns. This distance is a function of the wavelength of light used in constructing the hologram and also the angle difference between reference and object beam. This layered structure allows the reflection hologram to absorb, i.e. not reflect, any of the colors of light which do not have the correct wavelength. The wavelength which matches the fringe spacing will be reflected: the crests of the wavelengths which are too short or too long will eventually miss one of the planes and be absorbed into the darkness of the emulsion.

In a reflection type hologram the playback light or reconstruction beam comes from the same side of the hologram as the viewer. Some parts of the incident light are reflected, some are not, depending on the interference pattern. If the hologram was made correctly the result should be a visible three dimensional image. In contrast, for transmission holograms the reconstruction beam must pass through the hologram and come towards the viewer from the opposite side of the hologram. Just as very few transmission holograms are made in-line (or at 0 degrees), very few reflection holograms are made inline; otherwise the viewer would have to hold the playback light source close to his or her eyes. Most reflection holograms are made at a less severe angle, perhaps 160 degrees, so that the light can come in at an angle without being blocked by the person who is trying to see the hologram.

Real and Virtual Images

The image produced by the hologram can either appear to be in front of the holographic plate or film, or behind the film (or any position in between). As shown in FIG. 2, in the former case it is called a real image (projection); the latter is called a virtual image. In general it is easier to view a virtual image because you can see through the hologram as if it were a window. Note that the size of the window does not affect the apparent size of the image; a smaller window would simply allow a more confined view, or fewer possible angles of view, of the image. To view a virtual image the viewer looks through the hologram to perceive the object floating in the space behind it. In contrast, a real image appears in free space in front of the hologram. It is a little more difficult to view a real image because the viewer must find the image and focus his or her eyes in front of the hologram; the hologram itself is typically less capable to act as a guide for the viewer's eyes.

The real image is very exciting but there are a number of drawbacks. The object holographed should be quite a bit smaller than the size of the film you are using, or the viewer will not be able to see the complete real image of the object all at once. Also, without special precautions taken when constructing the hologram, the real image will be pseudoscopic. This means that everything that was closer to the film when the hologram was made will now be further away, and vice versa. This includes both individual objects in a shot or the different planes of space of an individual object. The pseudoscopic image is made by reversing the direction of the reference beam, or by turning the completed hologram around until seeing the image in front of the plate.

For example, referring to FIG. 3, if in making a hologram a salt shaker is placed closer to the film than a pepper shaker (the salt shaker may even cast a shadow from the object beam onto the pepper shaker), then in a pseudoscopic playback as a real image the pepper shaker will appear to be closer to the viewer than the salt shaker, which may no longer appear. However, in a virtual image of the same hologram the shakers would resume their original positions.

Image Plane holograms

Image plane holograms are transmission holograms which are viewable in white light and made using a first, master hologram as the object for making a final, second transmission hologram. However, although the master hologram is reproduced using an open aperture, the image is achromatic (black and white), and this method can only produce extremely shallow holograms without substantial blurriness. Rainbow or Benton holograms are modified image plane holograms in which the final transmission hologram is produced using a limited aperture. This reduces blurring of deeper holograms. However, Benton holograms may only be viewed from a small angular range due to the limited aperture; the entire hologram cannot be viewed from, for example, above or below. Because a Benton hologram is a transmission hologram, color control is limited. That is, all of the colors in a Benton hologram will shift throughout the color spectrum of the viewing light source, for example white light, when the viewing angle changes.

SUMMARY OF THE INVENTION
(DISCLOSURE OF THE INVENTION)

The present invention is a method for producing a reflection hologram, the method comprising the steps of providing an object hologram, disposing the object hologram proximate to a photosensitive material, scanning the object hologram with light from a coherent light source, the light passing through the photosensitive material; and reflecting the light back through the photosensitive material, thereby forming a reflection hologram viewable in white light. The scanning step preferably comprises scanning a laser beam having a beam thickness substantially less than the length of the object hologram. The scanning step preferably comprises scanning a laser beam having a width greater than or equal to the width of the object hologram. The method preferably further comprises the step of metallizing the front surface of the object hologram, the rear surface of the object hologram, or a support for the object hologram, in which case the reflecting step preferably comprises reflecting the light from the metallized front surface of the object hologram, or optionally passing the light through the object hologram, reflecting the light from the metallized back surface of the hologram or the metallized support, and passing the reflected light back through the object hologram.

The method preferably further comprises exposing different hologram areas of the object hologram with different apertures. One of the apertures is optionally open. The method preferably further comprises selecting a color of a hologram area by modifying the aperture. The scanning step preferably comprises scanning the light at an angle of incidence selected from the group consisting of approximately a reference angle used to manufacture the object hologram, approximately Brewster's angle, approximately the appropriate playback angle to produce an orthoscopic view, approximately perpendicular to the object hologram, and between approximately zero and approximately five degrees. The reflection hologram produced preferably comprises an edge lit reflection hologram when the angle of incidence is between approximately zero and approximately five degrees. The steps of the method may optionally be repeated for one or more additional object holograms.

The present invention is also a reflection hologram comprising one or more hologram areas which exhibit color shifting as a viewing angle is changed when viewed in light comprising a plurality of wavelengths. The range of colors exhibited during color shifting preferably comprises only a subset of the plurality of wavelengths. The size of the subset is preferably substantially smaller than a number of the wavelengths. The plurality of wavelengths preferably comprises a continuous range of wavelengths. The reflection hologram preferably further comprises at least one hologram area which does not exhibit color shifting as a viewing angle is changed when viewed in light comprising a range of wavelengths. Such area preferably comprises a plurality of solid colors. The reflection hologram is preferably lit from the front of the hologram with white light. The reflection hologram optionally comprises an anti-counterfeiting label. The reflection hologram optionally comprises a plurality of images which are viewable from a plurality of viewing angles. At least one particular image is preferably viewable only from a predetermined viewing angle. Alternatively, stored information is preferably accessible only from a predetermined angle. The reflection hologram optionally comprises an edge lit reflection hologram.

An object of the present invention is to produce a reflection hologram viewable in white light which has the desirable characteristics, such as diffraction spectrum color shifting control, access to one or more colors of the full spectrum (including the ability to choose a single color and view it as the non-diffracting color), and control of position and solidity, of a transmission or similar hologram or holographic optical element.

An advantage of the present invention is that the diffraction color spectrum of a transmission hologram, such as a 'Benton' limited aperture white light transmission hologram, can be converted into a white light reflection hologram using either a single wave length laser (or other coherent light source) or tunable wavelength laser (or multiple single wavelength lasers) without the limitations of lack of color selection of objects typically involved in normal white light transmission holograms, and with an aperture that may be opened to any desired value.

Another advantage of the present invention is that multiple colors are achievable without using a mutable laser or without having to swell the emulsion between exposures.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention preferably uses a transmission hologram or other holographic object, for example, as the object for making a reflection hologram. Single beam scanning reflection techniques are preferred but other techniques may be used. The mass production methods disclosed in U.S. patent application Ser. No. 11/459,821, entitled "Method and Apparatus for Mass Production of Holograms" and incorporated herein by reference, may be used in producing the holograms of the present invention.

As used throughout the specification and claims, "reflection hologram" means a volume hologram, reflection hologram, or thick hologram, and the like. As used throughout the specification and claims, "object hologram" means a transmission hologram, plane hologram, thin hologram, laser-illuminated or laser-lit hologram, phase hologram, holographic optical element (HOE), Benton hologram, rainbow hologram, image plane hologram, limited aperture hologram, transmission type optical relief hologram, image planed transmission hologram, holographic stereogram, diffractive hologram, diffraction grating, grating structure, multiplex hologram, dot matrix, rainbow, phase, or relief diffraction grating, electron beam hologram, Kinegram, or anything derived from a master hologram, whether comprising an image or designed for information storage and playback, and the like, including but not limited to any hologram that would be better, or more effectively made, as a transmission hologram, but that would be improved if it could be functionally converted to a reflection hologram.

As used throughout the specification and claims, "hologram area" means an area of a hologram or an image or part of an image that is reproduced in a hologram. As used throughout the specification and claims, "white light" means white light or any light which comprises multiple wavelengths.

Figure 1:
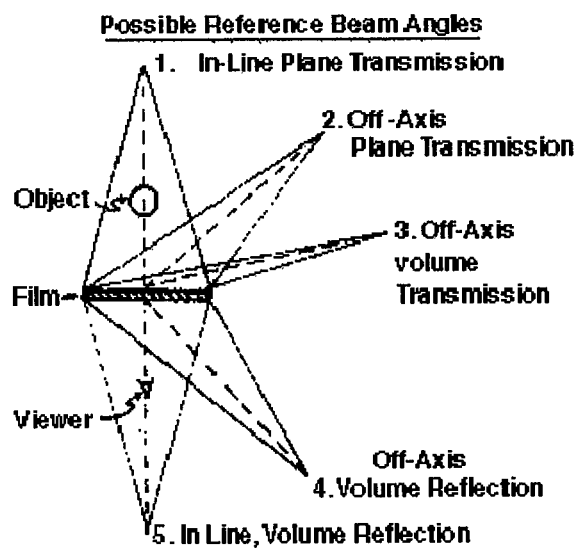
FIG. 1 shows possible reference beam angles when constructing a hologram.
Figure 2:
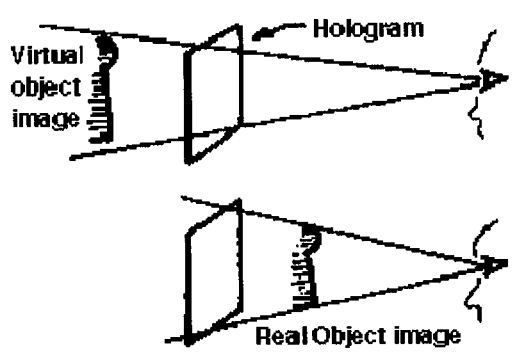
FIG. 2 shows the difference between a real image and a virtual image.
Figure 3:
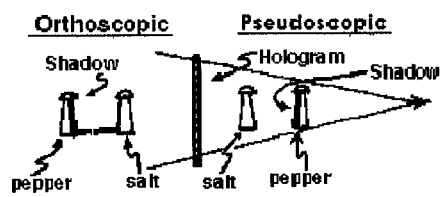
FIG. 3 illustrates a pseudoscopic image.
Figure 4:
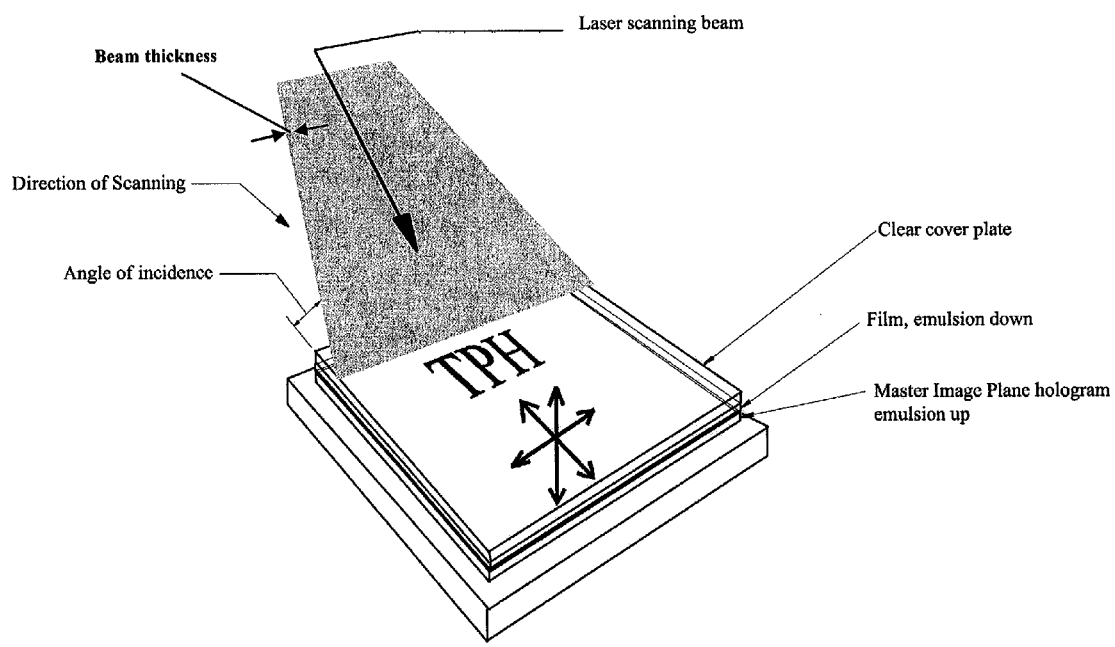
FIG. 4 depicts a method of making the white-light holograms of the present invention wherein the angle of incidence is less than ninety degrees.

Referring to FIG. 4, the object hologram is placed in the position to be converted with its exposed emulsion either up or down in relation to the film; preferably the emulsion is up and contacts the medium, which is preferably disposed emulsion side down. Any photosensitive, photoprofilable, or ablatable recording medium may be used in place of the film. If the object hologram's exposed emulsion does not contact the film, it is preferable to use a larger scanning length, or "thickness", of the scanned beam. The recording medium can be disposed on any suitable substrate or carrier medium, including but not limited to glass or film. Thus the photosensitive material is preferably sandwiched between the transmission hologram and the glass or film substrate. A cover plate which is clear, or substantially transparent to the laser's wavelength, may optionally be used. The entire "sandwich" is preferably disposed on a base plate, or optionally a roller or other curved support, the surface of which may optionally be mirrored to enhance reflectivity. The object hologram may also (or alternatively) comprise a highly reflective metal, typically vacuum-deposited, for example on the grating surface, or otherwise metallized surface for enhanced reflectivity. Any highly reflective material, such as aluminum, may be used. The hologram or support may alternatively be electroformed, as is normally done to produce a nickel shim. Any method that will maximize the reflective qualities of the hologram or support may be used. The "sandwich" is then scanned or exposed with a beam from a source of coherent electromagnetic radiation, for example a laser or other light, to a proper exposure time for the photosensitive material being used. The beam passes through the optional cover plate and unexposed recording medium and reflects off the base plate or object hologram and back through the recording medium to form a reflection hologram. The thickness or scanning length of the scanning beam is preferably as narrow as possible, and should be narrower than the length of the object hologram being scanned. As is shown in the figures, the width of the scanning beam preferably is at least as wide as the width of the object hologram to be scanned. After the exposure of the copy plate, a reflection hologram is developed. The resulting hologram will be a reflection hologram but will behave like a transmission hologram in certain aspects and as a reflection hologram in others.

The laser may be scanned at an angle of incidence approximately equal to the original angle used in the manufacture of the object hologram in order to produce a pseudoscopic image. Or the angle of incidence may be the chosen to be the appropriate angle to provide an orthoscopic (i.e. right reading) image, which may enhance the playback diffraction efficiency, preferably in white light, of the finished reflection hologram. However, it is possible to use any reference angle, or angle between the laser beam and the surface of the plate, for the exposure. Some applications may require a different incident angle, for example when reading a predetermined position to obtain selected information that is stored in the hologram. If the scan is made at an angle of incidence different than the reference angle of the master hologram, the optimal playback viewing angle is typically shifted. For example, Brewster's angle may be used as the scanning angle of incidence, which substantially eliminates any internal reflections of the scanning beam. This substantially eliminates Newton rings which are typically formed when the master is made at a different reference angle without having to rely on nonreflective coatings.

Figure 5:
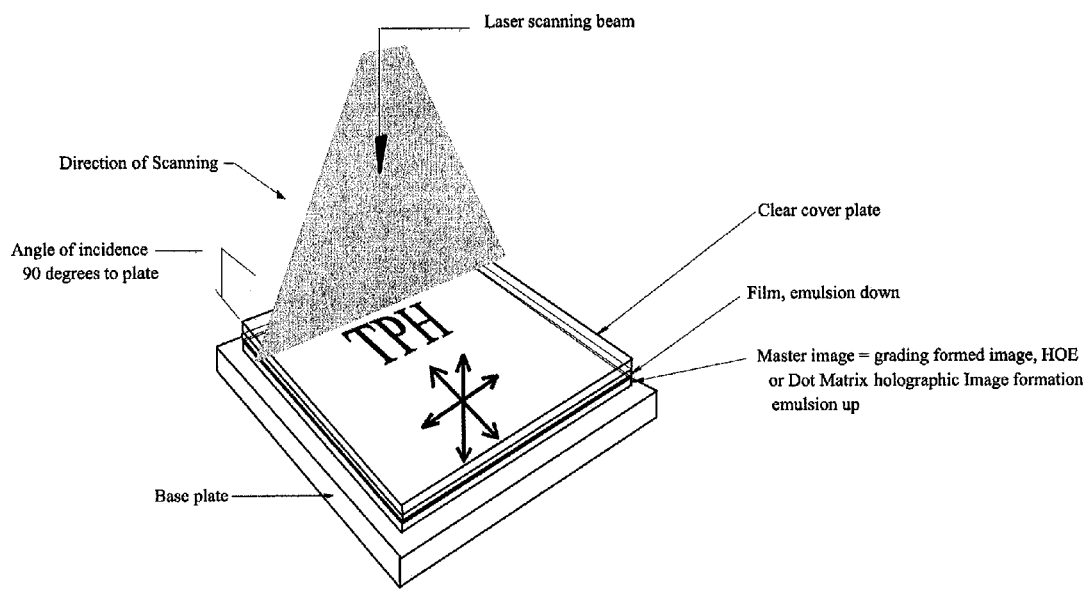
FIG. 5 depicts a method of making the white-light holograms of the present invention wherein the angle of incidence is approximately ninety degrees.

It is possible to use a zero order, or approximately perpendicular, reference beam, as shown in FIG. 5, which produces particularly good results for certain object holograms, for example a dot matrix hologram or holographic image, HOE, or grating formed image. Use of zero order scanning preferably creates a color in the emulsion, related to the recording wavelength, that shifts when viewed in white light. This shift, similar to that of optical variable ink, preferably occurs within certain parameters that are related to the recording wavelength and thickness of the recording medium.

Figure 6:
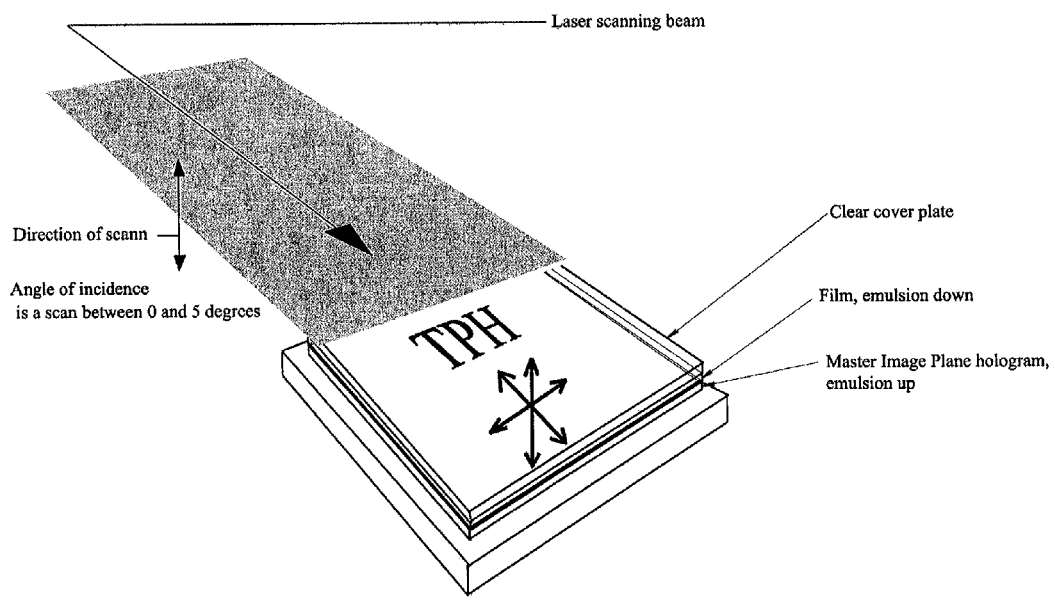
FIG. 6 depicts a method of making the white-light holograms of the present invention wherein the angle of incidence is approximately zero degrees, thereby producing an edge lit reflection hologram.

As shown in FIG. 6, the angle of incidence of the scanning beam may be between zero and approximately five degrees. This configuration can be used to produce a reflection edge lit hologram of any size. Typical edge lit holograms are very large transmission holograms for displays. Edge lit reflection holograms made according to the present invention can be of any size, including small labels.

Because the beam is scanned relative to the object hologram, unlike traditional holography methods, the beam need not be stabilized relative to the object hologram. This enables the use of a much simpler manufacturing apparatus.

Unlike Benton holograms, the aperture used in the present invention may be fully open. In that case, the resulting hybrid reflection hologram, made from a full spectrum transmission hologram as the object hologram, will typically have a solid color when viewed in white light (within a predefined area and depth of the hologram). Alternatively, the aperture may be limited to any desired value, producing a master hologram having a range of playback colors (which range is typically limited when compared to the range of colors displayed by a transmission hologram). All aperture widths are preferably controlled when producing the master hologram as is known in the art. Traditional reflection hologram methods must select for color by varying the color of the recording laser(s) or swelling the emulsion between exposures. In addition to those methods, the present invention enables the user to choose which colors are displayed by modifying the size or angle of the aperture(s) when making the master hologram. And different apertures can be used for exposing different hologram areas according to the present invention, so that when the final hybrid reflection hologram is produced, certain hologram areas can have solid, non-shifting colors (as is typical with a reflection hologram) while other hologram areas exhibit color shifting when the viewing angle is varied.

The hybrid reflection holograms of the present invention have many unique properties. Typical reflection holograms can only play back in the same color it was produced in, even when illuminated with white light. In order to get multiple colors, the emulsion must be swelled between multiple exposures, or alternatively a mutable laser and multiple color-sensitive emulsion must be used (with appropriately colored object holograms). Also typical reflection holograms do not exhibit color shifting when the viewing angle is changed. In contrast, the present holograms, when illuminated with white light, copy (for example) the rainbow effect of a rainbow hologram that was used as the object hologram. The colors may optionally have been modulated by the color of the exposing laser or other known techniques. The holograms of the present invention preferably have some of the benefits and playback properties of reflection holograms; for example, viewability in a reflected white light source, image solidity and stability, color selection, color stability (limited color shifting), wider deeper colors, front reflection playback, and single area image playback. They exhibit some or all of the diffraction colors and visual effects of the original transmission hologram while retaining the color control of a reflection hologram. The multiple shifting colors displayed by the hybrid reflection holograms of the present invention are typically centered around the reference angle and can change as the viewing angle is shifted, although the range of colors is typically far more limited than the range exhibited by a transmission hologram, which, like a prism, displays all of the colors included in the viewing light source (e.g. a complete spectrum for white light). Thus the range of color shifting that the hybrid reflection hologram exhibits preferably comprises only a subset of the colors included in the light source.

Unlike transmission holograms (e.g. embossed security holograms or those made from diffraction gratings by, for example, dot matrix or e-beam methods), reflection holograms typically can only be viewed from approximately the direction and angle of the recording source; they cannot be viewed from the reverse angle. Thus, as a reflection hologram, the present invention can produce another image (which is the same as or different than the original image) that is viewable only from the reverse angle, or other images which are viewable from their own reference angles. This capability is advantageous for security applications. This also is difficult to accomplish cleanly using transmission holograms known in the art, since there can be interference or "crosstalk" between the multiple images. And, since reflection holograms are more sensitive to the reference angle for image playback than transmission holograms, the hybrid reflection holograms of the present invention may be used for applications where precise control of the viewing angle, or location of stored information to be transferred, is desired while still providing some of the advantages of transmission holograms, such as color control and color shifting.

The present invention enables the use of object holograms or HOE's as reflections which do not comprise a reflective backing or metal surfacing (as is typically needed when producing embossed holograms) or the need for a back lighting source to playback the hologram in white light conditions. Thus the use of front mounted lighting is possible, with all its attendant benefits. Unlike transmission holograms, the information is stored throughout the emulsion layer of the hybrid reflection hologram of the present invention, as a true reflection hologram, and can not be electroformed or copied as easily as information in a transmission hologram, Benton or rainbow hologram, or the like. Thus holograms of the present invention are more secure than transmission holograms and thus more suitable for use as Optically Variable Devices, which are used, for example, as anti-counterfeiting labels. In addition, the quality and diffraction efficiency of the holograms produced according to the present invention is high enough to meet production standards for commercial use, using commercially-available recording media.

Multiple object holograms may be used to create a hybrid reflection hologram according to the present invention by multiply exposing the photosensitive medium. For example, the photosensitive medium may be exposed at different stations where different object holograms are located.

The hybrid reflection hologram of the present invention may optionally be affixed to a label, such as an RFID tag. The information in the RFID tag may correspond to information in the hologram. It may also optionally comprise printing which may relate to the image or other information contained in the hologram, similar to printing on embossed holograms known in the art.

A reflection hologram according to the present invention may optionally be made using normal (non-holographic) object. In this case, there would be no color shifting, but if a direct physical developer, for example, were used, the hologram may exhibit chromatic dispersion.

Example 1

A hybrid reflection hologram of the present invention was produced as follows:
1. A limited aperture white light transmission hologram of the size required was made.
2. The transmission hologram should be of high diffraction quality for best results. For this example, certain areas of a transmission hologram were exposed using a hinge point method commonly known in the industry to enable the separation of colors in the finished limited aperture white light hologram. It may be advantageous to make the color slits as narrow as possible in order to maximize the diffractive color range of the finished white light transmission hologram. Additional areas of the hologram were exposed using an open aperture and then were combined with the areas previously exposed.
3. A photosensitive photoresist, commonly used in embossed holography, was used as the recording medium. The hologram was developed in the normal manner.
4. When the hologram was finished it was metallized with aluminum, directly onto the surface gratings.
5. The metallized object hologram was placed in the position to be scanned and converted to a hybrid reflection hologram.
6. In suitable conditions (e.g. under safe lighting if required) the holographic emulsion was placed in contact with the metallized surface of the transmission hologram, forming a "sandwich" structure. The grating structures were in contact with the photosensitive material.
7. Relative to the angle that was used for the making of the original limited aperture transmission hologram, the object hologram was evenly scanned at an appropriate angle of incidence for playback with a single beam of a laser.
8. The photosensitive material was exposed at the correct exposure for the photosensitive material being used.
9. GP8, a Russian developer commonly used to make reflection holograms, was used to develop the hologram. A fixing agent was subsequently used. (Use of a fixing agent is optional.)
10. After washing and drying, the hologram was viewed in white light.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A reflection hologram comprising one or more hologram areas which exhibit controlled color changes that shift or change to a different color as a viewing angle is changed when viewed in white light comprising a plurality of wavelengths, at least one non-stereogram hologram area that does not exhibit color shifting as a viewing angle is changed when viewed in light comprising a range of wavelengths, and information stored throughout an emulsion layer, and wherein said reflection hologram does not comprise a reflective backing.

2. The reflection hologram of claim 1 wherein a range of colors exhibited during color shifting comprises only a subset of the plurality of wavelengths.

3. The reflection hologram of claim 2 wherein a size of the subset is substantially smaller than a number of the wavelengths.

4. The reflection hologram of claim 1 wherein the plurality of wavelengths comprises a continuous range of wavelengths.

5. The reflection hologram of claim 1 wherein said at least one hologram area comprises a single color or a plurality of single colors.

6. The reflection hologram of claim 1 which is lit from the front of the hologram with white light.

7. The reflection hologram of claim 1 comprising an anti-counterfeiting label.

8. The reflection hologram of claim 1 comprising a plurality of images which are viewable from a plurality of viewing angles.

9. The reflection hologram of claim 8 wherein a particular color is viewable only from a predetermined viewing angle.

10. The reflection hologram of claim 8 wherein stored color information is accessible only from a predetermined angle.

11. The reflection hologram of claim 1 comprising an edge lit reflection hologram.

12. The reflection hologram of claim 1 comprising diffraction spectrum color shifting control.

13. The reflection hologram of claim 1 comprising an optically variable device.

14. A reflection hologram comprising at least one area exhibiting color stability or limited color shifting, including one or more non-stereogram first areas comprising one or more single, nonshifting colors and one or more second areas that exhibit controlled color changes that shift or change to a different color when a viewing angle is varied when viewed in white light comprising a plurality of wavelengths, and additionally comprising information stored throughout an emulsion layer, and wherein said reflection hologram does not comprise a reflective backing.

15. The reflection hologram of claim 14 comprising colors modulated by a color of an exposing laser.

16. The reflection hologram of claim 14 comprising an optically variable device.

17. The reflection hologram of claim 14 comprising a plurality of images which are viewable from their own reference angles.

18. The reflection hologram of claim 14 comprising information stored by using multiple incident angles during exposure.

19. The reflection hologram of claim 18 comprising a subset of the colors included in an illuminating light source.

20. The reflection hologram of claim 14 attached to a radio-frequency identification (RFID) tag.

\* \* \* \* \*